(No Model.)

E. L. BABCOCK.
RIVET.

No. 253,494. Patented Feb. 14, 1882.

Witnesses —
Geo. F. Robinson
Jessie A. Horton

Inventor
Erskine L. Babcock
by Bradford Howland
Attorney

UNITED STATES PATENT OFFICE.

ERSKINE L. BABCOCK, OF CUYAHOGA FALLS, OHIO.

RIVET.

SPECIFICATION forming part of Letters Patent No. 253,494, dated February 14, 1882.

Application filed October 6, 1881. (No model.)

*To all whom it may concern:*

Be it known that I, ERSKINE L. BABCOCK, of Cuyahoga Falls, Summit county, Ohio, have invented a new and useful Improvement in Rivets, of which the following is a specification.

The nature and object of my invention is a rivet formed by welding together the head and shank, the head being perforated to receive the shank, and then subjected, with the end of the shank therein, to a welding heat, and while so heated shaped and welded to the shank.

Figure 1:
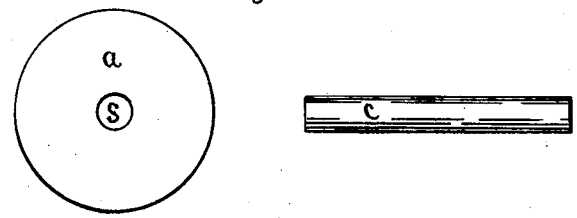
Figure 3:
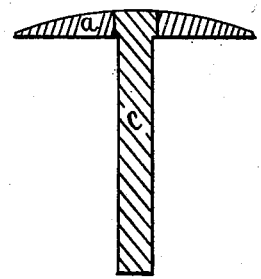
Figure 2:
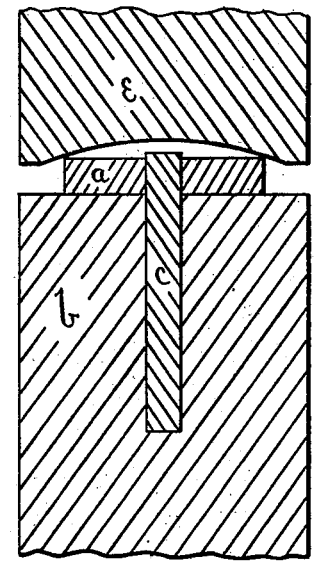

In the drawings, Figure 1 represents the head and shank separate. Fig. 2 is a section of the head with the shank inserted therein, and of a blank-holder and die or hammer for shaping the head and welding it to the shank. Fig. 3 is a section of the rivet with the head shaped and welded to the shank.

The head $a$ is in the form of an ordinary washer. The shank $c$ is a short wire or rod of a suitable diameter to enter and fit the perforation $s$ in head $a$.

In making the rivet one end of shank $c$ should be inserted through the perforation $s$ in head $a$, and then subjected, with the head, to a welding heat, and placed in blank-holder $b$. The head is then to be properly shaped and welded to the shank by blows of the hammer or die $e$.

I claim as my invention—

The process of manufacturing rivets by inserting the end of a short rod constituting the shank into the opening through a common metallic washer, and welding the rod and washer together, and forming the latter into a suitable shape for the rivet-head, substantially as described.

ERSKINE L. BABCOCK.

Witnesses:
E. C. RUGGLES,
SAML. HIGGS.